(12) United States Patent
Geck et al.

(10) Patent No.: US 7,113,511 B2
(45) Date of Patent: Sep. 26, 2006

(54) METHOD OF AUTOMATIC SIGNALING DETECTION FOR A HIGH SPEED COMMUNICATIONS LINK

(75) Inventors: Bertram Geck, Boca Raton, FL (US); Francisco Olympio Marcon da Rocha, Boca Raton, FL (US); Robinson Osmar Lima, Boca Raton, FL (US); Enoch Ragin, Jr., Boca Raton, FL (US); Luiz Cesar Zaniolo, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 870 days.

(21) Appl. No.: 10/092,834

(22) Filed: Mar. 7, 2002

(65) Prior Publication Data

US 2003/0169693 A1  Sep. 11, 2003

(51) Int. Cl.
*H04L 12/56* (2006.01)
(52) U.S. Cl. .................................. 370/395.5; 370/467
(58) Field of Classification Search ................ 370/386, 370/389, 395.2, 395.5, 453, 457, 466, 467, 370/471, 401, 410, 465; 709/230, 228, 223
See application file for complete search history.

(56) References Cited

U.S. PATENT DOCUMENTS

| 6,353,620 B1 * | 3/2002 | Sallberg et al. ............. 370/465 |
| 6,457,056 B1 * | 9/2002 | Choi ......................... 709/230 |

OTHER PUBLICATIONS

"ISDN Tutorial", http://www.ralphb.net/ISDN/.
"T1 Overview", http://www.techfest.com/networking/want/t1.html.

\* cited by examiner

*Primary Examiner*—Brenda Pham

(57) ABSTRACT

A communications network connected to a plurality of communications lines and method of managing connections to the network. The presence of an interface connection to a communications line is detected and initialized for signaling. First, the interface connection is initialized for a first signaling protocol, e.g., CCS. If initialization is successful, the connection uses that first signaling protocol. If not, the interface connection is initialized using a second signaling protocol, e.g., CAS. If initialization to the second protocol is successful, the connection uses that second signaling protocol. Otherwise an error message is returned.

14 Claims, 2 Drawing Sheets

METHOD OF AUTOMATIC SIGNALING DETECTION FOR A HIGH SPEED COMMUNICATIONS LINK

BACKGROUND OF THE INVENTION

1. Field of the Invention

The present invention is related to a communications system and more particularly to interfacing a communication system with a high speed link.

2. Background of the Invention

State of the art communication systems communicate with other entities, e.g., a public switch telephone network (PSTN) or a business network, over high speed communication links such as what are known as a T1 link for example. A typical T1 link has a data rate on the order of about 1.5 Megabits per second (Mbps). Communications over the high speed link may be shared by several different entities. To share the link, the high speed bandwidth is segmented into several individual channels using any one of a number of available approaches. Each of the entities communicate through a selected one of the channels. So, for example, a 1.544 Mbps T1 line may be segmented into 24 identical channels, each operating at an effective data rate of 64 Kbps. The 24 channels carry message information as well as typical channel control signals (signaling) that indicate channel connection, start of frame, end of frame, etc.

In what is commonly referred to as channel-associated signaling (CAS), each channel contains its own signaling. So, while each of the 24 channels may have an ultimate data transfer rate of 64 kbps, the actual data rate is somewhat reduced because of the included signaling, e.g., 56 kbps.

Another well known signaling method is common channel signaling (CCS) wherein signaling for all of the other channels of the link is carried on one dedicated (common) channel. CCS is well known, especially as applied to integrated services digital network (ISDN) communications. See, for example, Ralph Becker, "ISDN Tutorial" (1996–2000), located at http://www.ralphnb.net/IDSN. So, an example of a typical T1 link configured for CCS one channel is a dedicated signaling channel carrying signals for each of the remaining 23 message channels with all 24 channels at 64 Kbps.

A typical state of the art communication system may connect to both CAS and CCS channels and so, may include both CCS and CAS interfaces. State of the art T1 trunk interface cards may be configured for voice and data applications as either for CAS or CCS as required. Thus, data may be provided to the communications server using Internet Protocol (IP), ISDN, time division multiple access (TDM), global system for mobile (GSM) communications, or the like. To configure and activate the T1 interface for the appropriate protocol, all card parameters must be downloaded from the server. Typically, the protocol for each connection must be established by a customer engineer (CE) configuring the individual system interfaces. The CE must know á priori the correct protocol for each line connected to the interfaces. Only after identifying the correct protocol, can the CE manually configure the interface cards for a proper connection.

Unfortunately, configuration documentation for these interfaces may be questionable or erroneous. Further, if the customer engineer doesn't have á priori knowledge of the protocol used on a particular T1 link, then expensive equipment may be required to identify the type of T1 interface that is already running on adjacent channels. Very often operating this expensive equipment requires special expertise that the customer engineer may or may not have. Either way, end result may be an invalid or incorrect interface configuration exacerbating, installation time and increasing the service effort required for the installation.

Thus, there is a need for simplified interface card configuration method for automatically, identifying CAS or CCS as required for any particular connected communications line and establishing the channel correctly.

SUMMARY OF THE INVENTION

It is a purpose of the invention to reduce installation time and service effort required to add configurable interfaces to a communications server;

It is a purpose of the invention to reduce installation time and service effort required in connecting T1 interface cards to a T1 server;

It is another purpose of the invention to provide automatically configuring communications interfaces to recognize the correct protocol for connected communications line.

The present invention is a communications network connected to a plurality of communications lines and method of managing connections to the network. The presence of an interface connection to a communications line is detected and initialized for signaling. First, the interface connection is initialized for a first signaling protocol, e.g., CCS. If initialization is successful, the connection uses that first signaling protocol. If not, the interface connection is initialized using a second signaling protocol, e.g., CAS. If initialization to the second protocol is successful, the connection uses that second signaling protocol. Otherwise an error message is returned.

DESCRIPTION OF THE PREFERRED EMBODIMENT OF THE PRESENT INVENTION

Figure 1:
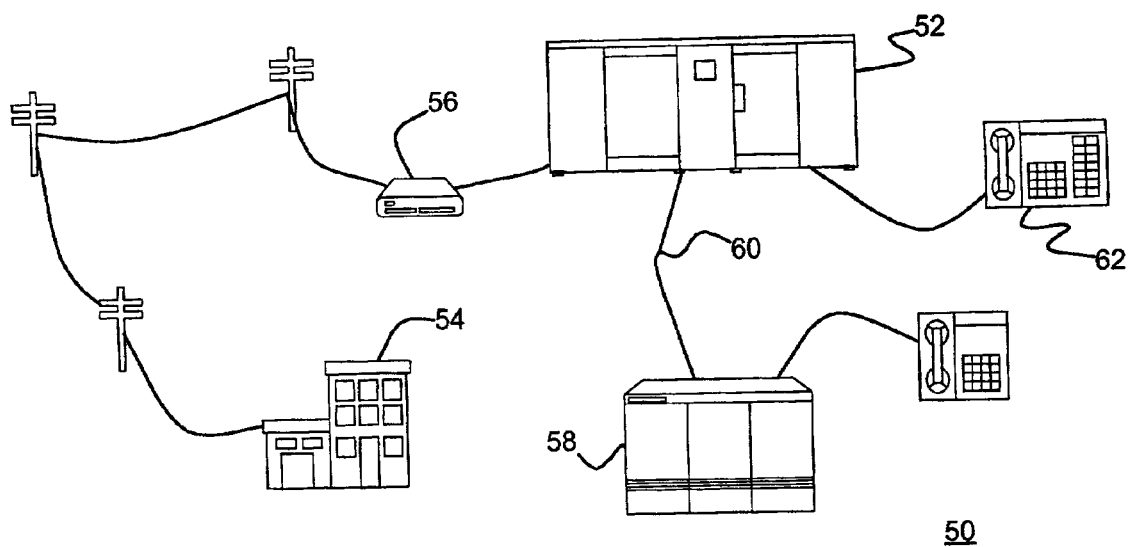
FIG. 1 is an example of a state of the art communication system wherein the communication server may have communications lines connected, each using CAS or CCS protocol for managing communications.

Turning now to the drawings, and more particularly to FIG. 1 is an example of a state of the art communication system 50 wherein the communication server 52 is capable of automatically configuring interface cards (not shown), e.g., the TMST1 and TST1 cards for the HiPath AllServ server from Siemens Information and Communication Network, Inc., according to a preferred embodiment of the present invention. In this example, the server 52 connects to a telephone network central office (CO) 54, communicating over a CAS channel, e.g., over a modem 56. The server 52 is also connected to a corporate network 58 over a CCS channel 60. Also, other communication devices 62 may be connected to the server 52, using either CAS or CCS depending upon each device's particular needs.

Telephone signaling controls how network related control information is passed between various terminals, switching nodes and user on the network. Functions can be categorized as belonging to one of two broad categories, i.e., either supervisory signals or signaling or information bearing signals or signaling. Supervisory signals convey status information and control network connected terminals, modes etc. Typical examples of supervisory signals include a request for service (off hook); ready to receive address (dial tone); call alerting (ringing); call termination (on hook); request for an operator or feature invocation (hook flash); called party ringing (ring back); and network or called party busy tones. Information bearing signals may include, for example, called party address, calling party address and toll charges. In addition, switching nodes can communicate between themselves using the channel signaling and to network control centers for network management functions.

For example, the signaling may convey status indicating the state of maintenance test signals, trunk state for all trunks, device busy or equipment failures. Signaling may contain routing and flow control information. As indicated above, each CAS channel includes call signaling information in the call channel. By contrast CCS configured communications use a separate signaling channel, independent of the call channels. CCS Signaling is not in the communications channel, but may be in frame. Each frame may contain multiple channel with one of the channels set aside for signaling. Thus, using CCS, call signaling may be passed using a completely different media independent of the medium over which the call is actually being placed.

Figure 2:
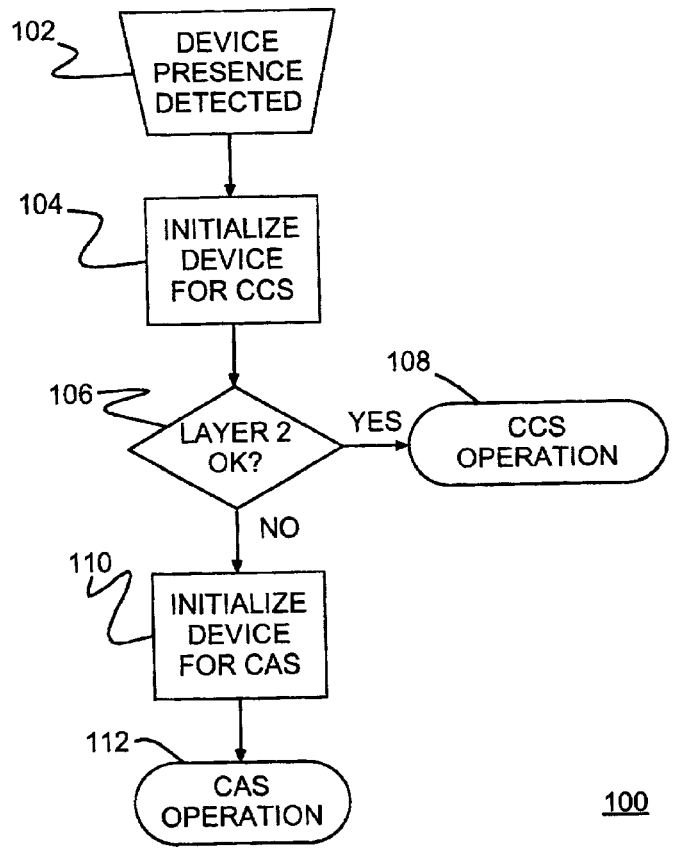
FIG. 2 is a method for initializing T1 trunk interface cards that are capable of operating as either a CAS interface or CCS interface.

FIG. 2 is an example of a preferred embodiment method for initializing trunk interface cards that are capable of operating as either a CAS interface or CCS interface. First, in step 102 the presence of an interface connection to a communications line is detected and initialized for signaling. Then, in step 104 the interface connection is initialized for a first signaling protocol, e.g., CCS. If in step 106 layer 2 communication has been setup, initialization is successful and the connection uses that first (CCS) signaling protocol in step 108. If not, then in step 110 the interface connection is initialized for a second signaling protocol, e.g., CAS. If CAS initialization to the second protocol is successful, in step 112 the connection uses that second (CAS) signaling protocol. Otherwise an error message is returned.

So, for example, there are two types of CCS ISDN service, basic rate interface (BRI) and primary rate interface (PRI). BRI includes two communication channels (B channels) and one signaling channel (D channel). Each of the communication channels is 64 Kbps and the signaling channel is 16 Kbps for a total of 144 Kbps. PRI includes 23 B channels at 64 Kbps each and one D channel also at 64 Kbps for a total of 1536 Kbps. The typical ISDN link is organized in communication layers with the Physical Layer (Phy Layer) as layer 1, a data link layer in layer 2 and a network layer in layer 3. Station-to-station communications are passed in layer 3. For proper communications in layer 3, layers 1 and 2 must be successfully executed. Therefore, the interface card must successfully negotiate layer 1 and 2 in a CCS channel.

As noted above and described in more detail by Becker (supra), layer 1 is the Phy Layer and is specified for ISDN applications by International Telecommunication Union (ITU) I-series and G-series documents. The BRI service interface is specified as a 2-wire connection with 2 binary bits per baud, 80 kilobaud (baud=1 modulation per second) for a 160 Kbps transfer rate. Data encoding schemes permit this relatively high data rate over ordinary single-pair local loop, with the 2 Binary 1 Quaternary (2B1Q) as the most common signaling method. The 2B1Q protocol is defined in detail in 1988 ANSI specification T1.601.

Layer 2 is the Data Link Layer and is specified for ISDN applications by the ITU Q.920–23 specifications. All of the D channel signaling is defined in the Q.921 specification. The Layer 2 protocol used is Link Access Protocol-D (LAP-D) channel and is almost identical to the older protocol X.25 LAP-B.

Layer 3 is the Network Layer and is specified for ISDN applications by the ITU specifications Q.930–39. Layer 3 is used for the establishment, maintenance, and termination of logical network connections between two devices. Service Profile IDs (SPIDs) in Layer 3 identify services and features provided.

The original T1 layer 1 interface is known as D4 framing. A D4 frame is 193 bits long and includes 24 8-bit channels for 192 bits and a single framing bit, which is the $193^{rd}$ bit. What is known as a superframe is a sequence of 12 consecutive frames. The 12 framing bits from the 12 consecutive frames form a unique framing pattern, 100011011100. This pattern is repeated continuously until the receiving equipment locks onto it to properly synchronize for the layer 1 setup. Supervisory information, layer 2 signaling uses what is known as "bit robbing." Essentially, bit robbing uses the least significant bit in each of the sixth and twelfth channels of the superframe for supervisory signaling. This 2 bits per channel supervisory signaling indicates on-hook, off-hook, dialing and busy status. Further layer 2 signaling is in the eighth bit of every byte of every frame which is set to a 1 whenever data is being transmitted. Thus, of the 64 Kbps per channel 8 Kbps is dedicated to signaling and the data rate for each is 56 KBPS.

A newer T1 protocol, known as extended superframe format (ESF), extends the superframe from 12 frames for D4 to 24 frames. The $193^{rd}$ bit location of each frame of an ESF superframe serves three different purposes. Of the 24 bits in the $193^{rd}$ bit location for each ESF frame, 6 bits carry frame synchronization, 6 bits carry error detection information and 12 bits carry maintenance communications. So, instead of the 12bit superframe synchronization pattern as used in D4, only 6bits are used for ESF synchronization. Further, ESF includes a 6 bit cyclic redundancy check (CRC) sequence for link level error checking. Receiving equipment calculates a CRC value for each received frame and compares that calculated value with the CRC value in the next ESF superframe. If the two values compare correctly, then, the likelihood that the superframe contains bit errors is very low. The 12 maintenance communications bits provide the channel with a 4Kbps maintenance communications capacity that operators at the network control center can use to interrogate remote equipment, e.g., for information on link performance. ESF also uses a modified type of bit robbing for in-band signaling. Both D4 and ESF are examples of CAS. Typically, CCS uses this same framing at the layer 1 interface. The data link layer (layer 2), however, organizes the frame as 23 barrier channels plus one data control channel as explained hereinabove.

The LAP-D Layer 2 protocol includes fields for a start flag (1 octet), an address (2 octets), Control (2 octets), Layer 3 protocol information and user data, CRC (2 octets) and an end flag (one octet). Both the start and the end flag are always $7E_{16}$ (0111 1110). Each Address includes: a 6-bit service access point identifier (SAPI); a Command/Response (C/R) bit that indicates if the frame contains a command or a response; a first address field extension bit (EA0) that indicates whether the current octet is the final octet of the address or node; a server bit Terminal Endpoint Identifier (TEI) that is a 7 bit device identifier; and, a second address field extension bit (EA1) that is the same as EA0.

The SAPI identifies the point where Layer 2 provides a service to Layer 3. In particular, the SAPI may direct which communications procedures are followed, i.e., call control procedures, Packet Mode using Q.931 call procedures, Packet Mode communications procedures, or Management Procedures.

Each connected device is assigned a unique ID or Terminal Endpoint Identifier (TE). Each TE may be fixed or dynamic; the value may be assigned statically when the TE is installed, or dynamically when the device is activated. Also, all devices may be selected for a particular message, i.e., the message is broadcast to all devices.

For CCS, layer 1 is established upon receipt of the sync field. The Layer 2 establishment begins when the Terminal Endpoint (the interface card being connected) and the network initially exchange Receive Ready (RR) frames, each listening for someone to initiate a connection. To respond to the RR, the interface card sends an Unnumbered Information (UI) frame with a SAPI indicating a management procedure to query the network and as a broadcast TEI. Then, the network assigns an available TEI and sends a Set Asynchronous Balanced Mode (SABME) frame that includes the call control SAPI used to initiate a SETUP and the TEI of the value assigned by the network. Finally, the network responds with an Unnumbered Acknowledgment (UA), a call control procedures SAPI and the assigned TEI.

So, according to a preferred embodiment method, the interface is initialized to CCS through layer 1 and layer 2. If that initialization is successful, i.e., T1 layer error alarms have been cleared (i.e., no errors have been detected) and the layer 2 startup procedures have been called successfully, then the CCS protocol procedures have been successfully executed and it has been established that the interface is connected to a CCS line. However, if CCS initialization is unsuccessful, then the system proceeds to the CAS layer 2 startup procedures. A successful CAS layer 2 startup indicates that the channel is CAS and communications proceed. Failure to initialize either CCS or CAS elicits an error signal which is passed to the communication system, indicating that an error has occurred.

Figure 3:
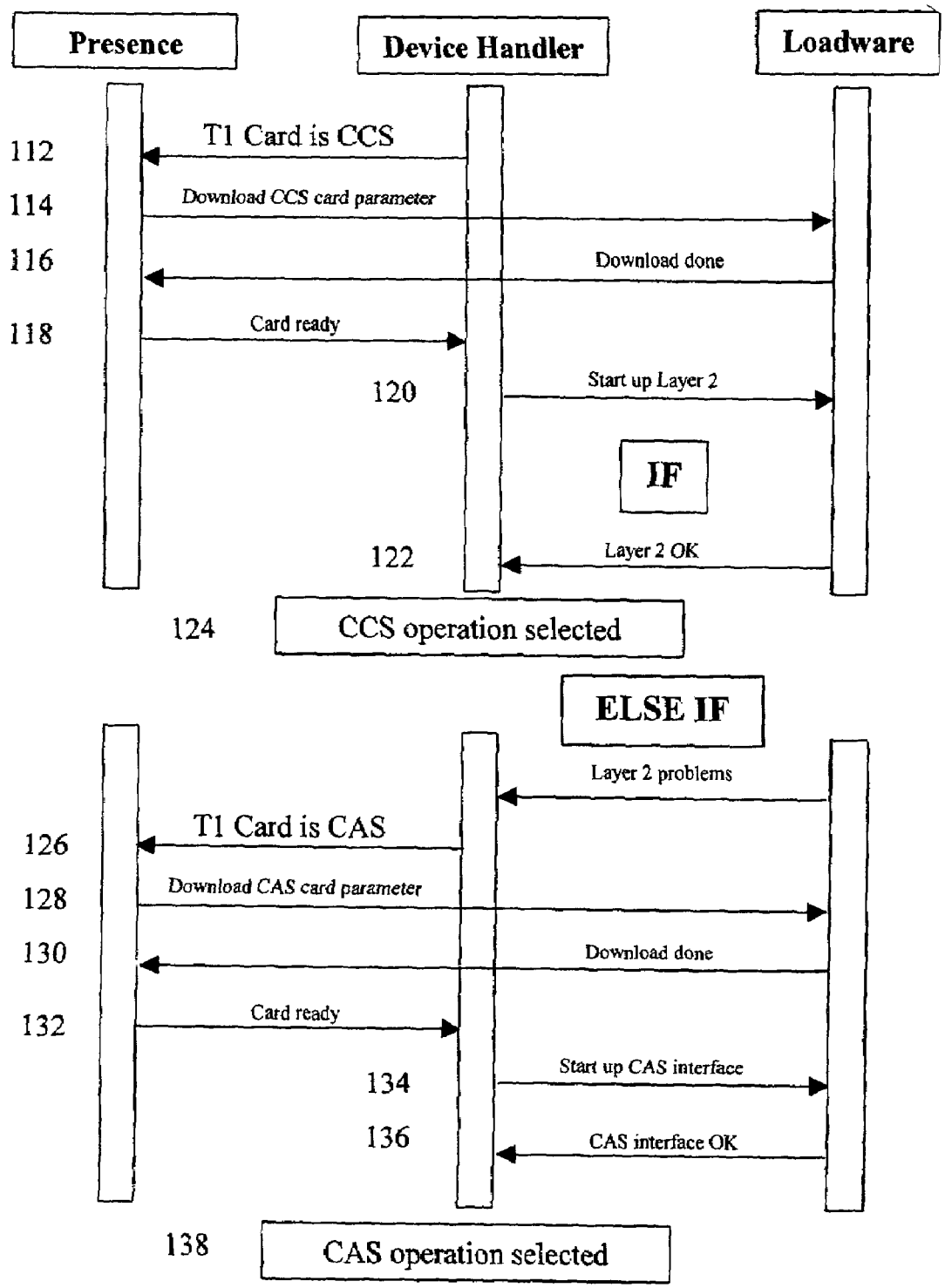
FIG. 3 is an example in more detail of the interface initialization procedure according to a preferred embodiment of the present invention.

FIG. 3 is an example in more detail of the interface initialization procedure 110 according to a preferred embodiment of the present invention. After the system detects the presence of the interface card, in step 112 CCS Phy Layer initialization begins. The CCS parameters are downloaded in step 114 from loadware in the communication server. A download complete in step 116 indicates that the card is ready 118 to begin layer 2 initialization 120. After layer 2 set up, a check is made in step 122 to determine if the layer 2 setup is successful. If the layer 2 setup is successful then, the channel is using CCS and the set up is complete in step 124. Otherwise, if problems occurred during the layer 2 setup, then, in step 126 the set up proceeds under the assumption that the connection is a CAS channel. CAS card parameters are downloaded in step 128 from the loadware. When the download is complete, in step 130 a check is made whether the interface is set up and ready. If the interface is ready in step 132, the interface is treated as a CAS interface 134. A check is made in step 136 to determine if the CAS interface is proper. As long as this test 136 returns an indication that the connection is proper, the interface has been setup in step 138 and communication can begin using CAS protocol. An indication of an improper interface initialization at both setups is treated as an error and an error notification is provided to the system.

Thus, the communications server and appurtenant channel interfaces are configured automatically for connected channels, without manual intervention from a CE and free from any requirement for special knowledge or skill. System setup occurs smoothly and quickly.

While the invention has been described in terms of preferred embodiments, those skilled in the art will recognize that the invention can be practiced with modification within the spirit and scope of the appended claims.

What is claimed is:

1. A method of managing connections to a communications network, said method comprising the steps of:
   a) detecting the presence of an interface connection to a communications line;
   b) initializing said interface connection to said communications line for a first signaling protocol, comprising the steps of:
      i) downloading CCS interface parameters from a communications server;
      ii) waiting for an interface ready signal; and
      iii) initiating layer 2 negotiations, an indication of successful layer 2 negotiations indicating successful CCS initialization;
   c) checking whether said interface connection has initialized successfully; and, if said check indicates that said interface connection has not initialized successfully,
   d) initializing said interface connection for a second signaling protocol;
   wherein said first signaling protocol is common channel signaling (CCS) and said second signaling protocol is channel associated signaling (CAS).

2. A method as in claim 1 wherein, if in the checking step (c), said interface connection has initialized successfully, said interface connection provides communications over said communications line using said first signaling protocol.

3. A method as in claim 1 after initializing step (d), said method further comprising the steps of:
   e) checking whether said interface connection has initialized successfully to said second signaling protocol; and, if said check indicates that said interface connection has initialized successfully,
   f) providing communications over said communications line using said second signaling protocol.

4. A method as in claim 3 wherein, if in the checking step (c), said interface connection has initialized successfully, said interface connection provides communications over said communications line using said first signaling protocol.

5. A method as in claim 3 wherein, if in the checking step (e), said interface connection has not initialized successfully, said interface connection returns an error message to said communications system.

6. A method as in claim 1 wherein, said interface connection is a T1 interface.

7. A method of managing connections to a communications network, said method comprising the steps of:
   a) detecting the presence of an interface connection to a communications line;
   b) initializing said interface connection to said communications line for a first signaling protocol;
   c) checking whether said interface connection has initialized successfully: and, if said check indicates that said interface connection has not initialized successfully,
   d) initializing said interface connection for a second signaling protocol, comprising the steps of:
      i) downloading CAS interface parameters from a communications server;
      ii) waiting for an interface ready signal; and iii) initiating a CAS interface, an indication of a valid CAS interface indicating successful CAS initialization;

wherein said first signaling protocol is common channel signaling (CCS) and said second signaling protocol is channel associated signaling (CAS).

8. A communications network connected to a plurality of communications lines, said communications network comprising:

means for detecting the presence of an interface connection to a communications line;

interface connection initialization means for initializing said interface connection to a signaling protocol, said interface connection initialization means initializing said interface connection to a first signaling protocol upon detection of the presence of said interface connection; and checking means for checking whether said interface connection has initialized successfully, if said checking means determines that said interface connection has initialized to said first signaling protocol successfully, said interface connection provides communications over-said communications line using said first signaling protocol, otherwise, said initialization means initializing said interface connection for a second signaling protocol;

wherein said first signaling protocol is common channel signaling (CCS) and said second signaling protocol is channel associated sianaling (CAS);

wherein the initializing means comprises:

downloading means for downloading interface parameters from a communications server;

means for waiting for an interface ready signal; and signaling negotiation means for negotiating physical layer and data link layer setup.

9. A communications network as in claim 8, wherein after said initialization means initializes said interface connection for said second signaling protocol, said checking means checks whether said interface connection has initialized successfully to said second signaling protocol and, if said check indicates that said interface connection has initialized successfully, said communications interface provides communications over said communications line using said second signaling protocol.

10. A communications network as in claim 9 wherein if after said initialization means initializcs said interface connection for said second signaling protocol, said check indicates that said interface connection has not initialized successfully, an error message is returned.

11. A method of automatically configuring channel interfaces in a communications network, said method comprising the steps of:

a) detecting the presence of a channel interface connected to a communications line;

b) initializing said channel interface for a first signaling protocol, comprising the steps of:

i) downloading CCS interface parameters from a communications server;

ii) waiting for an interface ready signal; and iii) initiating layer 2 negotiations, an indication of successful layer 2 negotiations indicating successful CCS initialization;

c) checking whether said channel interface has initialized successfully and if said channel interface has initialized successfully, providing communications over said communications line using said first signaling protocol; otherwise, d) initializing said interface connection for a second signaling protocol;

e) checking whether said interface connection has initialized successfully to said second signaling protocol; and, if said check indicates that said interface connection has initialized successfully, f) providing communications over said communications line using said second signaling protocol;

wherein said first signaling protocol is common channel signaling (CCS) and said second signaling protocol is channel associated signaling (CAS).

12. A method as in claim 11 wherein, if in the checking step (e), said channel interface has not initialized successfully, an error message is returned to said communications system.

13. A method as in claim 11 wherein, said channel interface is a T1 interface.

14. A method of automatically configuring channel interfaces in a communications network, said method comprising the steps of:

a) detecting the presence of a channel interface connected to a communications line;

b) initializing said channel interface for a first signaling protocol;

c) checking whether said channel interface has initialized successfully and if said channel interface has initialized successfully, providing communications over said communications line using said first signaling protocol; otherwise, d) initializing said interface connection for a second signaling protocal, comprising the steps of:

i) downloading CAS interface parameters from a communications server;

ii) waiting for an interface ready signal; and iii) initiating a CAS interface, an indication of a valid CAS interface indicating successful CAS initialization;

e) checking whether said interface connection has initialized successfully to said second signaling protocol; and, if said check indicates that said interface connection has initialized successfully, f) providing communications over said communications line using said second signaling protocol wherein said first signaling protocol is common channel signaling (CCS) and said second signaling protocol is channel associated signaling (CAS).

* * * * *